July 3, 1962 R. L. SWANSON 3,042,419
NYLON DRILL CHUCK
Filed March 24, 1959

*INVENTOR.*
RICHARD L. SWANSON
BY
Charles L. Lovechich
ATTORNEY 3,042,419
NYLON DRILL CHUCK
Richard L. Swanson, 3420 Grubb Road, Erie, Pa.
Filed Mar. 24, 1959, Ser. No. 801,634
1 Claim. (Cl. 279—103)

This invention relates to tool holders and, more particularly, to drill chucks that are commonly used in drilling machines for holding twist drills and in milling machines and the like for holding arbors, etc.

This application is a continuation in part of application, Serial No. 572,873, filed March 21, 1956, which issued as Patent No. 2,879,069 on March 24, 1959.

The said application discloses a tapered nylon drill sleeve or chuck. The present invention constitutes an improvement over the said application in that the chuck in the present invention does not have a key attached to one end thereof but is round on the end and relies entirely on its properties of the material used therein to cause it to resist rotation in the drill quill.

It is, accordingly, an object of this invention to provide a drill sleeve or chuck which is simple in construction, economical to manufacture, and simple and efficient in operation.

Another object of the invention is to provide an improved drill sleeve or chuck.

Still another object of the invention is to provide an improved drill sleeve or chuck made of plastic material having the properties of high tensile strength, no plastic deformation, rigidity, low elasticity, and being of an improved shape.

A further object of the invention is to provide a drill chuck made of nylon which constitutes an improvement over prior drill sleeves and chucks.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

Figure 2:
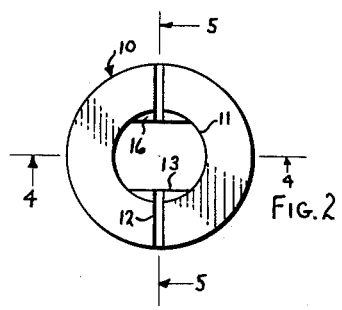
FIG. 2 is a view of the drill side or bottom surface of the chuck.
Figure 3:
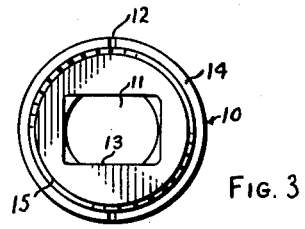
FIG. 3 is a view of the chuck end or top of the device.
Figure 1:
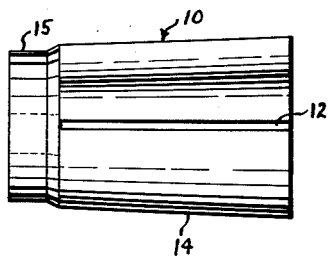
FIG. 1 is a side view of a drill chuck according to the invention.
Figure 4:
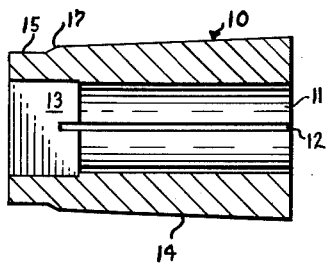
FIG. 4 is a cross sectional view taken on line 4—4 of FIG. 2.
Figure 5:
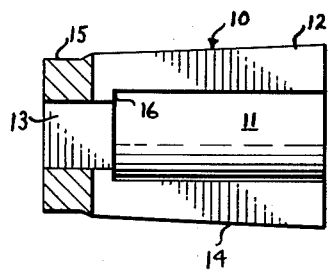
FIG. 5 is a cross sectional view taken on line 5—5 of FIG. 2.

Now with more specific reference to the drawing, a drill sleeve or chuck 10 is shown having a bore 11 therein and a generally square bore aligned therewith having walls 13 forming a keyway. An outside surface 14 of the drill sleeve 10 is tapered in, for example, a standard Morse taper or other convention taper to fit the quill of a drill press with which it is to be used. A reduced size upper end 15 is of smaller diameter and is cylindrical and extends upwardly from a tapered surface 17 of the sleeve 10.

The bore 11 is cylindrical and will be of the particular size to fit around the shank of a straight shank drill. The bore 11 terminates at a shoulder 16 at the keyway 13. A slot 12 is cut through the sleeve 10 and extends longitudinally of the sleeve 10 and extends up into the keyway 13.

Therefore, when a straight shank drill is inserted into the drill sleeve 10 and the drill sleeve 10 is inserted into the quill of a drill press, the pressure from the quill will cause the slot 12 to close and the inner surface of the bore 11 will grip the drill shank firmly and hold the drill positively against relative rotation.

Because of the properties of the nylon material used, the sleeve 10 will not slip in the quill of the drill press during normal drilling operations nor will the drill slip in the bore 11 of the chuck; however, when the drill strikes an obstruction, due to the properties of the nylon material, the chuck will give enough to allow the drill to free itself and, therefore, the drill will not be broken.

The foregoing specification sets forth the invention in its preferred practical forms but it is understood that the structure shown is capable of modification within a range of equivalents without departing from the invention which is to be understood is broadly novel as is commensurate with the appended claims.

The embodiments of the invention in which an exclusive property or privilege is claimed are defined as follows:

A hollow chuck for a machine tool made of material having the properties of nylon having an external tapered surface, said hollow in said chuck being cylindrical and adapted to receive and frictionally engage the cylindrical end of a shaft to transmit torque between said chuck and said shaft, said external tapered surface adapted to be received in an internally tapered member whereby the internal surface of said hollow of said chuck is adapted to be urged into frictional engagement with said shaft, and a slot cut through the side walls of said chuck from said hollow to the outside and extending the full length of said tapered surface from one end thereof to the other, said hollow in said chuck teminating adjacent a reduced size bore in the form of a keyway, said slot extending from said one end through said bore and terminating in the portion of said chuck which defines said keyway.

References Cited in the file of this patent
UNITED STATES PATENTS

| | | |
|---|---|---|
| 1,287,068 | Marti et al. | Dec. 10, 1918 |
| 1,304,473 | Glenzer | May 20, 1919 |
| 1,753,471 | Paige et al. | Apr. 8, 1930 |
| 1,863,107 | Glenzer | June 14, 1932 |
| 2,695,787 | Sunnen | Nov. 30, 1954 |
| 2,759,734 | Velepec | Aug. 21, 1956 |
| 2,840,382 | Velepec | June 24, 1958 |

FOREIGN PATENTS

| | | |
|---|---|---|
| 865,417 | France | May 3, 1941 |